(12) United States Patent
Pastouchenko et al.

(10) Patent No.: US 10,677,163 B2
(45) Date of Patent: Jun. 9, 2020

(54) NOISE ATTENUATION STRUCTURES

(71) Applicant: General Electric Company, Schenectady, NY (US)

(72) Inventors: Nikolai N. Pastouchenko, Glenville, NY (US); Lawrence Chih-hui Cheung, Niskayuna, NY (US); Umesh Paliath, Clifton Park, NY (US); Trevor Howard Wood, Clifton Park, NY (US); Hongbin Ju, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/833,390

(22) Filed: Dec. 6, 2017

(65) Prior Publication Data

US 2019/0211748 A1   Jul. 11, 2019

(51) Int. Cl.
*F02C 7/045* (2006.01)
*B64D 33/02* (2006.01)
*F02K 1/82* (2006.01)

(52) U.S. Cl.
CPC ............. *F02C 7/045* (2013.01); *B64D 33/02* (2013.01); *F02K 1/827* (2013.01); *B64D 2033/0206* (2013.01); *F05D 2250/283* (2013.01); *F05D 2260/96* (2013.01)

(58) Field of Classification Search
CPC . F02C 7/045; B64D 33/02; B64D 2033/0206; F02K 1/827; F05D 2260/96
USPC ....... 181/213, 214, 215, 216, 219, 241, 287, 181/292
See application file for complete search history.

(56) References Cited

U.S. PATENT DOCUMENTS

| 5,584,447 | A | * | 12/1996 | Pla | ................... | B64D 33/06 |
| | | | | | | 244/1 N |
| 5,702,230 | A | * | 12/1997 | Kraft | .................. | F01D 25/04 |
| | | | | | | 415/119 |
| 5,930,371 | A | * | 7/1999 | Cheng | ................ | F01N 1/023 |
| | | | | | | 381/71.5 |
| 5,979,593 | A | * | 11/1999 | Rice | ............. | G10K 11/17861 |
| | | | | | | 181/207 |
| 6,173,806 | B1 | * | 1/2001 | Ito | .................... | E01F 8/0094 |
| | | | | | | 181/206 |

(Continued)

OTHER PUBLICATIONS

Yong et al., "Control Strategies for Aircraft Airframe Noise Reduction", Chinese Journal of Aeronautics, vol. 26, Issue 2, pp. 249-260, Apr. 2013.

(Continued)

*Primary Examiner* — Jeremy A Luks
(74) *Attorney, Agent, or Firm* — Christopher R. Carroll; The Small Patent Law Group LLC (57) ABSTRACT

Noise attenuation structures, such as acoustic liners for gas turbine engines, are provided. For example, an acoustic liner comprises a face sheet, a backing sheet spaced apart from the face sheet, and a plurality of cavities defined between the face and backing sheets. The cavities are defined by cavity walls. A plurality of backing sheet walls extends from the backing sheet toward the face sheet. The backing sheet walls extend adjacent the cavity walls, and the backing sheet is movable with respect to the face sheet such that the cavities have a variable depth. Other embodiments of noise attenuation structures also are provided.

19 Claims, 7 Drawing Sheets

(56) References Cited

U.S. PATENT DOCUMENTS

| | | | | |
|---|---|---|---|---|
| 6,782,109 | B2* | 8/2004 | Sheplak | G10K 11/172 381/152 |
| 7,055,648 | B2* | 6/2006 | Byrne | F02C 7/045 181/216 |
| 7,337,877 | B2* | 3/2008 | Goenka | F02M 35/1261 123/184.56 |
| 7,533,760 | B1* | 5/2009 | D'Angelo | F01N 1/00 181/196 |
| 8,640,825 | B2* | 2/2014 | Vauchel | F02K 1/827 181/222 |
| 8,727,070 | B2* | 5/2014 | Huber | F23M 20/005 123/184.55 |
| 8,931,588 | B2* | 1/2015 | Murray | F02K 3/06 181/214 |
| 9,514,734 | B1 | 12/2016 | Jones et al. | |
| 10,088,165 | B2* | 10/2018 | Nguyen | F23R 3/28 |
| 10,415,471 | B2* | 9/2019 | Marchaj | G10K 11/172 |
| 2001/0017232 | A1 | 8/2001 | Hogeboom et al. | |
| 2005/0013457 | A1 | 1/2005 | Sheplak et al. | |
| 2005/0161280 | A1* | 7/2005 | Furuya | F01N 1/003 181/225 |
| 2006/0162998 | A1* | 7/2006 | Hawkins | G10K 11/175 181/293 |
| 2006/0169532 | A1 | 8/2006 | Patrick | |
| 2013/0000770 | A1 | 1/2013 | Bouty et al. | |
| 2013/0126265 | A1 | 5/2013 | Sternberger et al. | |
| 2018/0258956 | A1* | 9/2018 | Marchaj | F02C 7/045 |
| 2018/0313273 | A1* | 11/2018 | Jodet | F02C 7/24 |

OTHER PUBLICATIONS

Jones et al., "Evaluation of Variable-Depth Liner Configurations for Increased Broadband Noise Reduction", American Institute of Aeronautics and Astronautics, pp. 1-13, 2015.

Gabard, "Boundary Layer Effects on Liners for Aircraft Engines", Journal of Sound and Vibration, vol. 381, pp. 30-47, Oct. 27, 2016.

"External Aircraft Noise Reduction Liners", National Aeronautics and Space Administration, 2017.

* cited by examiner

NOISE ATTENUATION STRUCTURES

FIELD

The present subject matter relates generally to noise attenuation structures. More particularly, the present subject matter relates to acoustic liners for gas turbine engines.

BACKGROUND

Aircraft engine noise is a significant problem in high population areas and noise-controlled environments. The noise is generally composed of contributions from various source mechanisms in the aircraft, with fan noise typically being a dominant component of engine noise at take-off and landing. Fan noise is generated at the fan of the aircraft engine, propagates through the engine intake and exhaust duct, and is then radiated to the outside environment. Acoustic liners are known to be applied on the internal walls of the engine's casing and hub to attenuate the fan noise propagating through the engine ducts. Typical acoustic liners for engines are either a single degree of freedom (SDOF) liner, or a two degree of freedom (2DOF) liner, sometimes referred to as a double degree of freedom (DDOF) liner. Acoustic liners also may be applied to other portions of the engine to attenuate noise from other engine components. Further, the principles of acoustic liners may apply generally to noise attenuation structures for other applications.

Usually, SDOF liners are formed of a porous facing sheet backed by a single layer of cellular separator such as honeycomb cells, which itself is backed by a solid backing plate that is substantially impervious to higher frequency noise transmission. 2DOF liners, on the other hand, are formed of two cellular layers between the porous facing sheet and the solid backing plate, with the two cellular layers separated by a porous septum sheet. The acoustic performance of both SDOF and 2DOF liners is strongly dependent on the depth of the cells in each honeycomb layer, where the cell depth controls the internal volume of the cell that is available for acoustic resonance. The additional layer of the 2DOF liner allows noise suppression of at least one other main frequency than the SDOF liner. However, the additional layer of the 2DOF liner significantly increases the weight of and cost to produce the liner and also requires more room to accommodate the additional layer, which increases the thickness of the liner.

At least some known SDOF honeycomb acoustic liners attempt to achieve the multiple frequency advantages of the 2DOF liner in an SDOF construction by forming individual cells within the core layer to have variable depths from the perforate facing sheet, thereby creating different resonant cavity volumes within the same SDOF layer. However, this variable depth construction approach is very costly because of the complexity of actively modifying cells depths for individual cells. Further, some acoustic liners attempt to increase noise attenuation by providing acoustic communication between the cells of the core layer. Nevertheless, such attempts provide a fixed porosity or percent open area of the cell walls, which at least fails to accommodate changes in engine noise (e.g., changes in frequency and/or axial wavenumber) based on engine operating conditions.

Accordingly, improved noise attenuation structures, such as structures that allow non-locally reactive noise attenuation, would be desirable. For example, noise attenuation structures, such as acoustic liners for gas turbine engines, that include features for active variable depth control of the cells would be beneficial. Further, noise attenuation structures that include features for active control of the core layer porosity would be useful.

BRIEF DESCRIPTION

Aspects and advantages of the invention will be set forth in part in the following description, or may be obvious from the description, or may be learned through practice of the invention.

In one exemplary embodiment of the present subject matter, an acoustic liner for a gas turbine engine is provided. The acoustic liner comprises a face sheet, a backing sheet spaced apart from the face sheet, and a plurality of cavities defined between the face sheet and the backing sheet. The cavities are defined by cavity walls. A plurality of backing sheet walls extends from the backing sheet toward the face sheet. The backing sheet walls extend adjacent the cavity walls, and the backing sheet is movable with respect to the face sheet such that the cavities have a variable depth.

In another exemplary embodiment of the present subject matter, an acoustic liner for a gas turbine engine is provided. The acoustic liner comprises a face sheet, a backing sheet spaced apart from the face sheet, and a plurality of cavity walls extending from the face sheet toward the backing sheet such that a plurality of cavities are defined between the face sheet and the backing sheet. The backing sheet comprises a plurality of backing sheet members that are each spaced a variable distance from the face sheet. Each backing sheet member includes at least one backing sheet wall, and each backing sheet wall defines at least one aperture therein. Further, each cavity has a volume, each cavity wall defines at least one aperture therein, and the cavities form a core layer. The face sheet is positioned at a first end of the core layer and a backing sheet member provides an endwall at a second end of the core layer such that the volume of each cavity is variable with the distance the backing sheet member is spaced from the face sheet. A backing sheet member extends across the second end of more than one cavity. The at least one backing sheet wall of each backing sheet member extends adjacent and parallel to a cavity wall such that a percent open area of the cavity wall is variable with the distance the backing sheet member is spaced from the face sheet. The distance each backing sheet member is spaced from the face sheet is variable based on an operating condition of the gas turbine engine.

In a further exemplary embodiment of the present subject matter, a noise attenuation structure is provided. The noise attenuation structure comprises a face sheet having a plurality of openings defined therein, a backing sheet spaced apart from the face sheet, and a plurality of cavity walls extending from the face sheet toward the backing sheet such that a plurality of cavities are defined between the face sheet and the backing sheet. The backing sheet comprises a plurality of backing sheet members that are each spaced a variable distance from the face sheet. Each backing sheet member includes at least one backing sheet wall, and each backing sheet wall defines at least one aperture therein. Moreover, each cavity has a volume and each cavity wall defines at least one aperture therein. The face sheet defines a first end of each cavity and a backing sheet member defines a second end of each cavity such that the volume of each cavity is variable with the distance the backing sheet member is spaced from the face sheet. A backing sheet member defines the second end of more than one cavity. The at least one backing sheet wall of each backing sheet member extends adjacent and parallel to a cavity wall such that a percent open area of the aperture in the cavity wall is variable with the distance the backing sheet member is spaced from the face sheet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Further, with respect to engine embodiments described herein, the terms "fore" and "aft" generally refer to a position in relation to an ambient air inlet and an engine exhaust nozzle of the engine.

Figure 1:
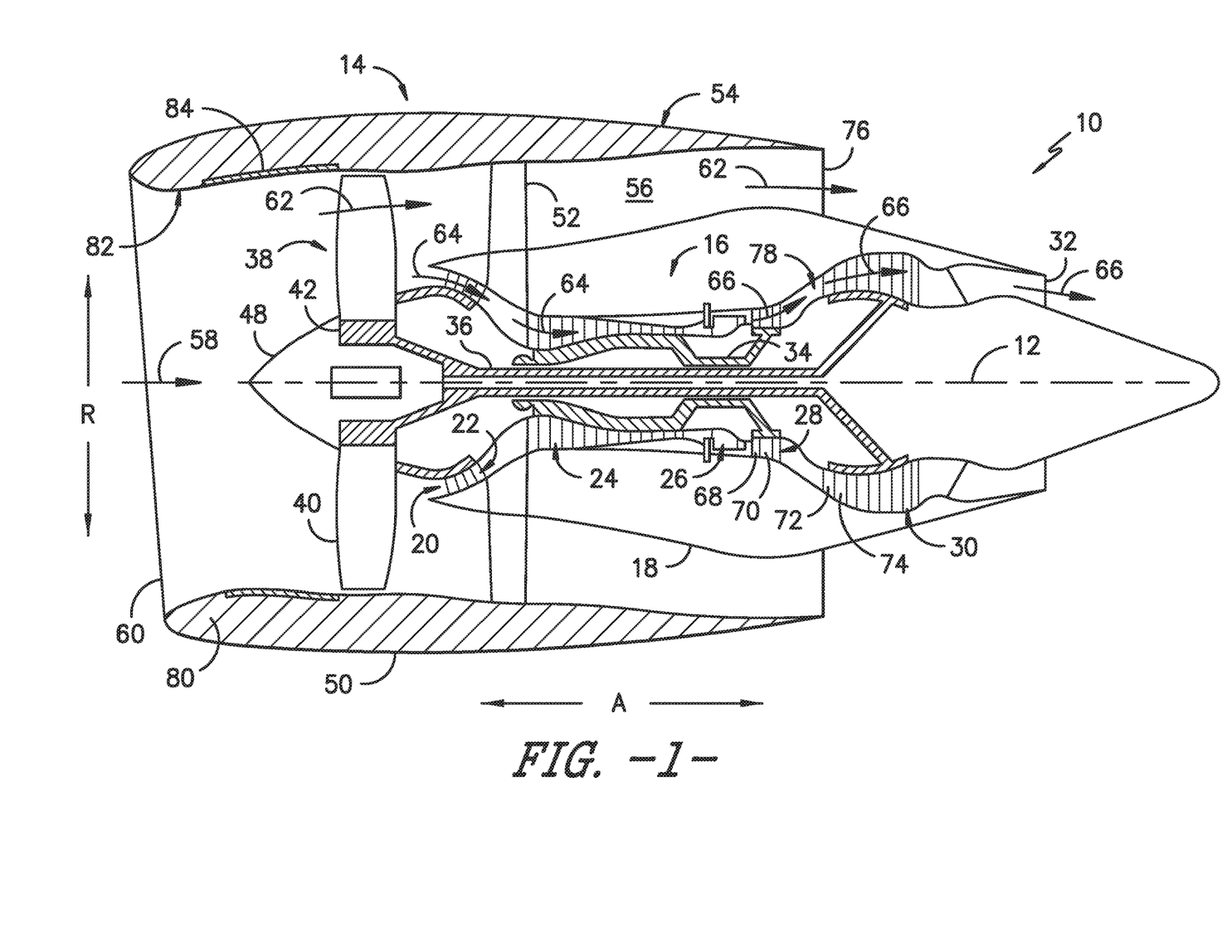
FIG. 1 provides a schematic cross-section view of an exemplary gas turbine engine including an acoustic liner, according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Keeping with FIG. 1, the outer nacelle 50 defines a fan duct 80 having a duct inner wall 82 that receives the volume of air 58 entering the turbofan 10 through inlet 60. An acoustic liner or noise attenuation structure 84 is disposed along the duct inner wall 82. In the depicted exemplary embodiment, the acoustic liner 84 has an annular construction and is disposed along duct inner wall 82 upstream of the fan blades 40. In other embodiments, an acoustic liner 84 may be disposed in other locations as well. For example, in addition to or as an alternative to the acoustic liner 84 upstream of the fan blades 40, an acoustic liner 84 may be disposed along the inner wall of nacelle 50 between the fan blades 40 and the outlet guide vanes 52 and/or along the fan nozzle exhaust section 76. As further examples, an acoustic liner 84 may be disposed along an outer wall of outer casing 18 and/or along the jet exhaust section 32. Stated more generally, an acoustic liner 84 may be disposed along the duct inner wall 82 downstream of fan blades 40, and/or along nonrotating portions of nacelle 50 or other components, ducts, or casings within turbofan engine 10 where noise suppression is appropriate, or which are capable of intercepting and suppressing engine noise. For instance, an acoustic liner 84 may be disposed along the inboard (hub) or outboard (casing) surfaces of the flowpath of interest, such as the fan bypass passage 56 or the core exhaust section 32.

In operation, the rotation fan 38 and nacelle 48 produce broadband and discrete tonal noise predominately at a blade passage frequency (BPF) and multiples thereof. During takeoff of the aircraft, when the fan blades 40 reach transonic and supersonic velocities, noise is generated therefrom and propagated out of the fan duct 80 into the surrounding environment. In the exemplary embodiment, the acoustic liner 84 serves to suppress noise resonating at the BPF and harmonics of the BPF. More particularly, the acoustic liner 84 is configured to absorb sound waves and thereby reduce the level of sound waves radiating from the fan duct 80.

Figure 2:
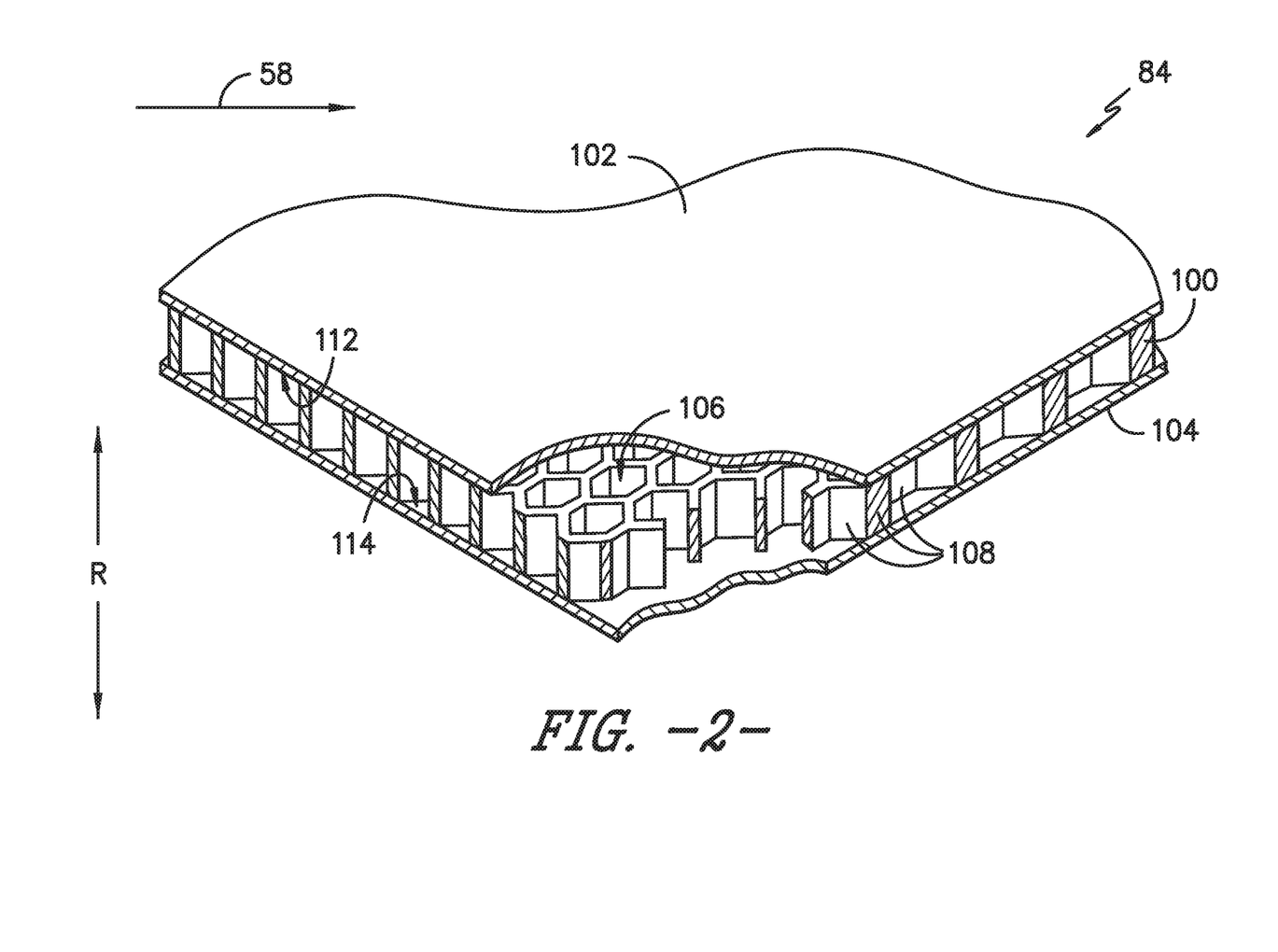
FIG. 2 provides an isometric partial cutaway view of a portion of the acoustic liner depicted in FIG. 1, according to an exemplary embodiment of the present subject matter.

FIG. 2 is an isometric partial cutaway view of a portion of the acoustic liner 84 depicted in FIG. 1, disposed proximate airflow 58, in accordance with an exemplary embodiment of the present subject matter. The acoustic liner 84 includes a core layer 100 topped by a perforated face sheet 102 and backed by an imperforate backing sheet 104. For clarity, a plurality of backing sheet walls 118, which extend from the backing sheet 104 and are described in greater detail with respect to FIGS. 4-7, are omitted from FIGS. 2 and 3, and the division of the backing sheet 104 into multiple members 116 is not shown in FIG. 2.

Figure 3:
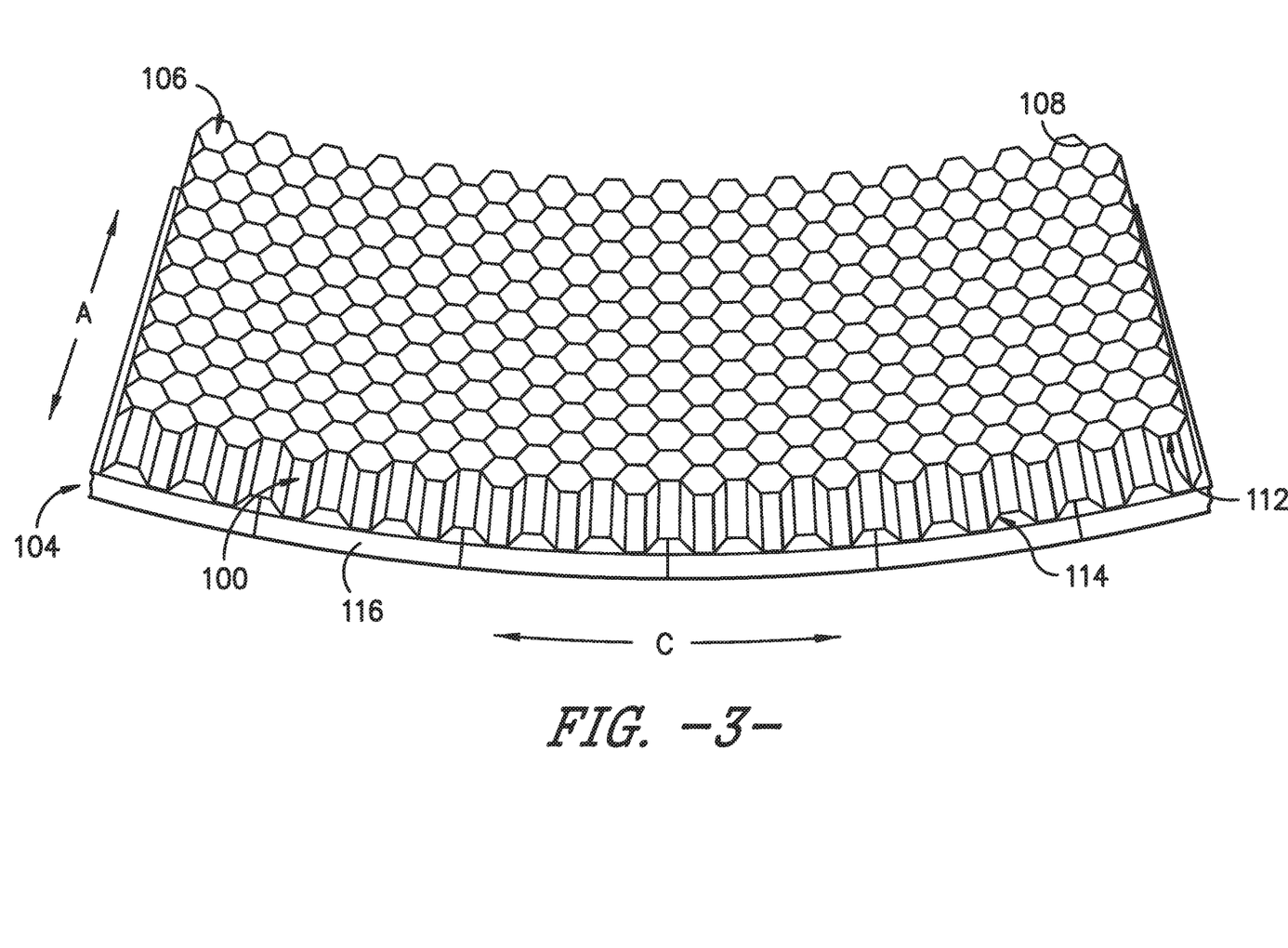
FIG. 3 provides a perspective view of a honeycomb structure of a core layer of the acoustic liner of FIG. 1, according to an exemplary embodiment of the present subject matter.

The core layer 100 has a cellular honeycomb structure formed of a plurality of partitioned laterally adjoining hexagonal cells or cavities 106, as best seen in FIG. 3. In other embodiments, the cavities 106 may have other polygonal or other suitable shapes. In the depicted exemplary embodiment, individual cavities 106 are shaped as hexagonal tubes, sometimes referred to as hollow hexagonal prisms, each sharing one lateral rectangular facet or wall 108 with an adjacent cavity 106. The lateral walls 108 align parallel to the central axis $A_C$ of the respective hexagonal prism structure that they partition. Further, at least a portion of the lateral walls 108 have at least one aperture 110 defined therein to facilitate the movement of sound waves from one cell or cavity 106 to an adjacent cavity 106 such that the aperture 110 allows acoustic communication between two or more cavities 106.

The face sheet 102 is attached to an inner end 112 of the core layer 100, and an outer end 114 of the core layer 100 extends toward the backing sheet 104. In the exemplary embodiment, the terms "inner" and "outer" refer to the orientation of the respective layers in relation to longitudinal axial centerline 12 shown in FIG. 1. The face sheet 102 may be attached to the lateral walls 108 by adhesive bonding, e.g., by thermal, sonic, and/or electric welding processes. Typically, the face sheet 102 is formed of a porous material, such as a wire mesh, a perforated sheet, or a woven or nonwoven fibrous material, but the face sheet 102 need not be formed from a porous material. The core layer 100 is molded, or fabricated by an accumulative manufacturing process, such as 3-D printing. As described in greater detail below, the backing sheet 104 is formed from a plurality of backing sheet members that each are configured to independently move toward and away from the face sheet 102. The acoustic liner 84 is secured within turbofan engine 10 by attaching the acoustic liner 84 to the duct inner wall 82, as shown in FIG. 1, using any suitable conventional attachment means.

The ability of the acoustic liner 84 to attenuate noise at a desired frequency, or range of frequencies, is dependent on its acoustic impedance, which is a function of a number of parameters, including the depth and porosity of the cavities 106, as well as the resident volume contained therein. As used herein, the porosity of the cavities 106 refers to the communication between cavities 106, i.e., the extent to which one cavity 106 is open to an adjacent cavity 106 such that sound waves can move between cavities 106 to dissipate acoustic energy. As described more fully herein, the present subject matter relates to actively changing the depth and porosity of cavities 106 based on the operating condition of turbofan engine 10, e.g., takeoff, cut-back, and landing, to optimize noise attenuation for a given operating condition.

Figure 4:
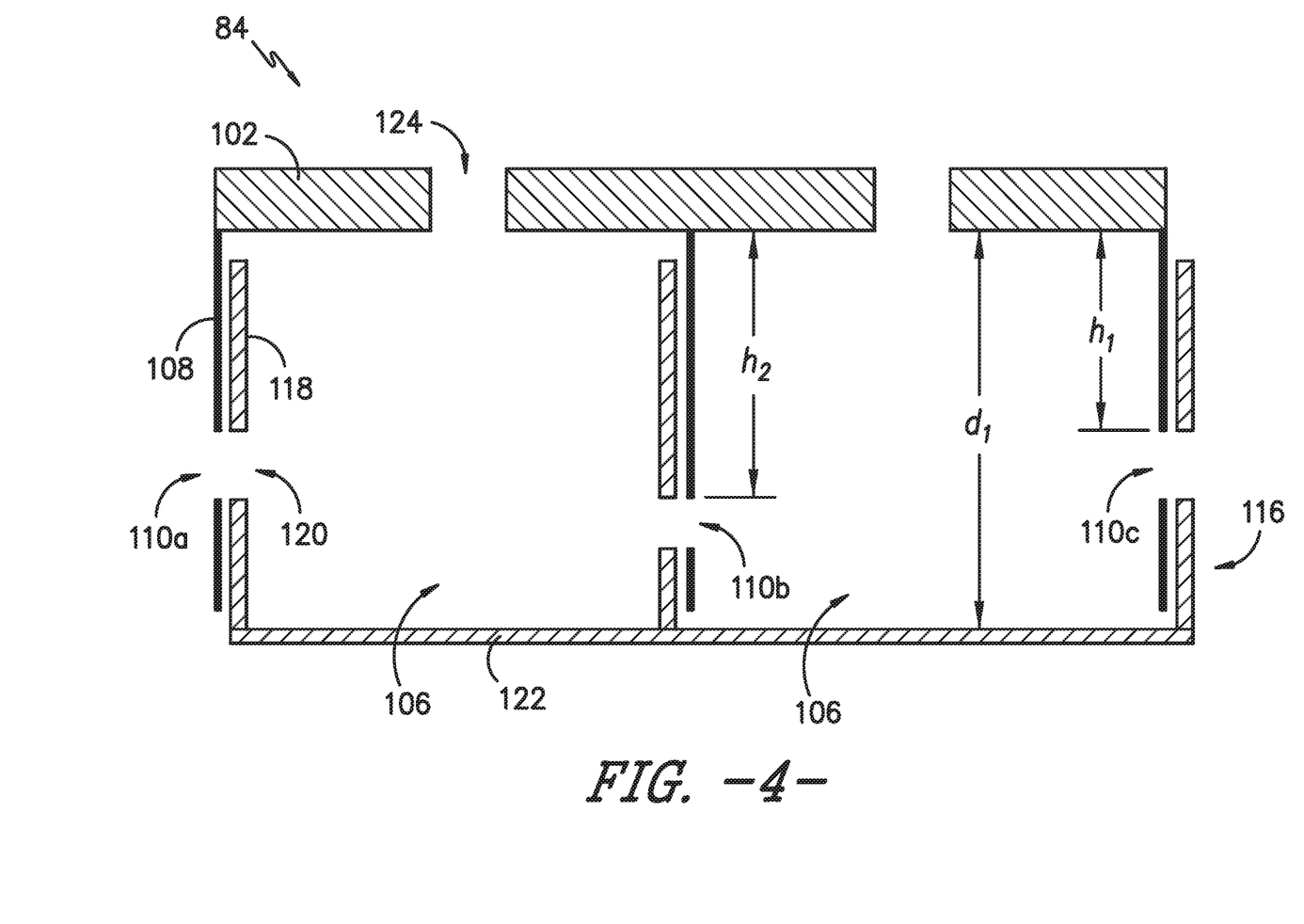
FIGS. 4, 5, and 6 provide a schematic cross-section view of a portion of the acoustic liner of FIG. 1 in different configurations based on operating conditions of the gas turbine engine of FIG. 1, according to exemplary embodiments of the present subject matter.
Figure 5:
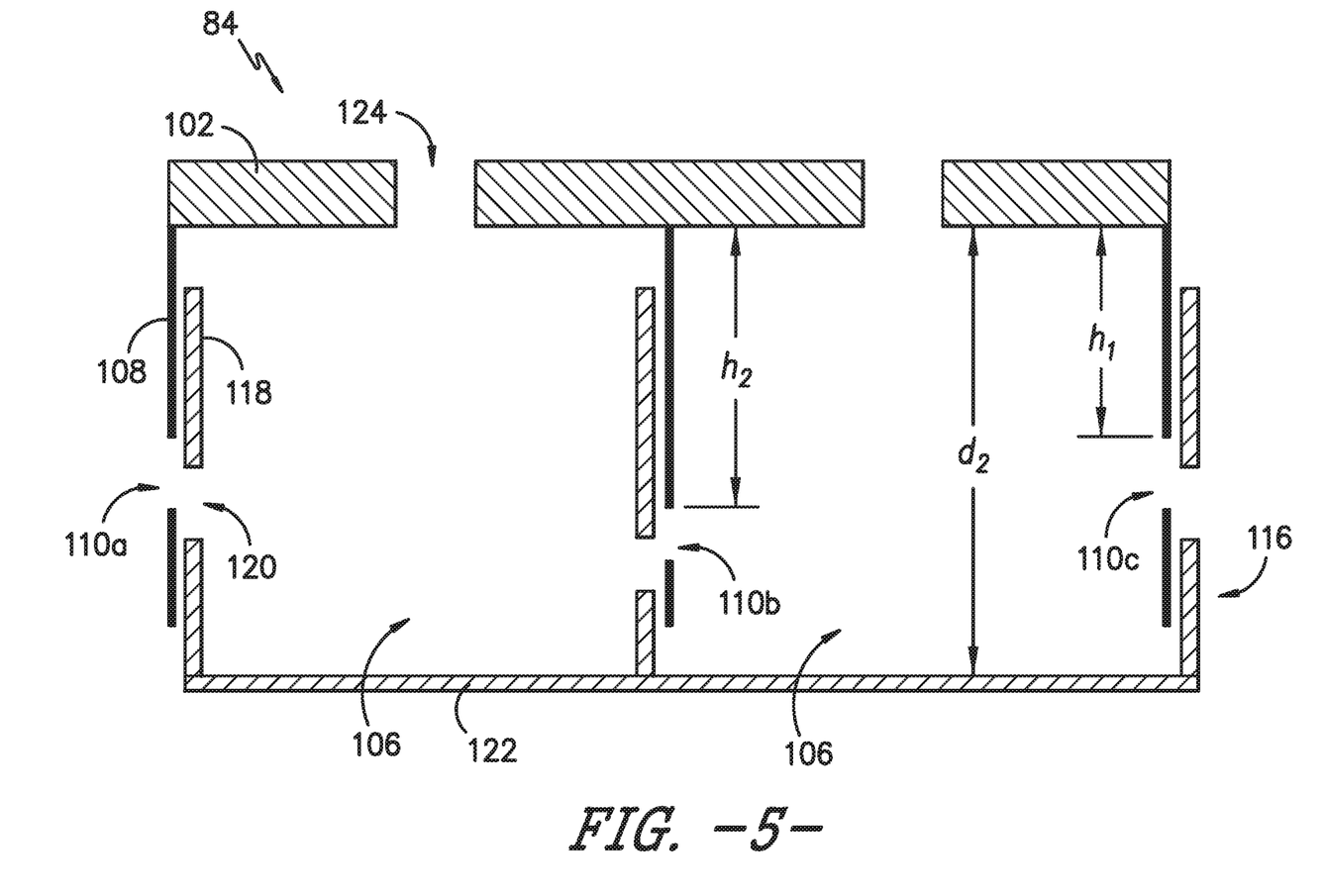
Figure 6:
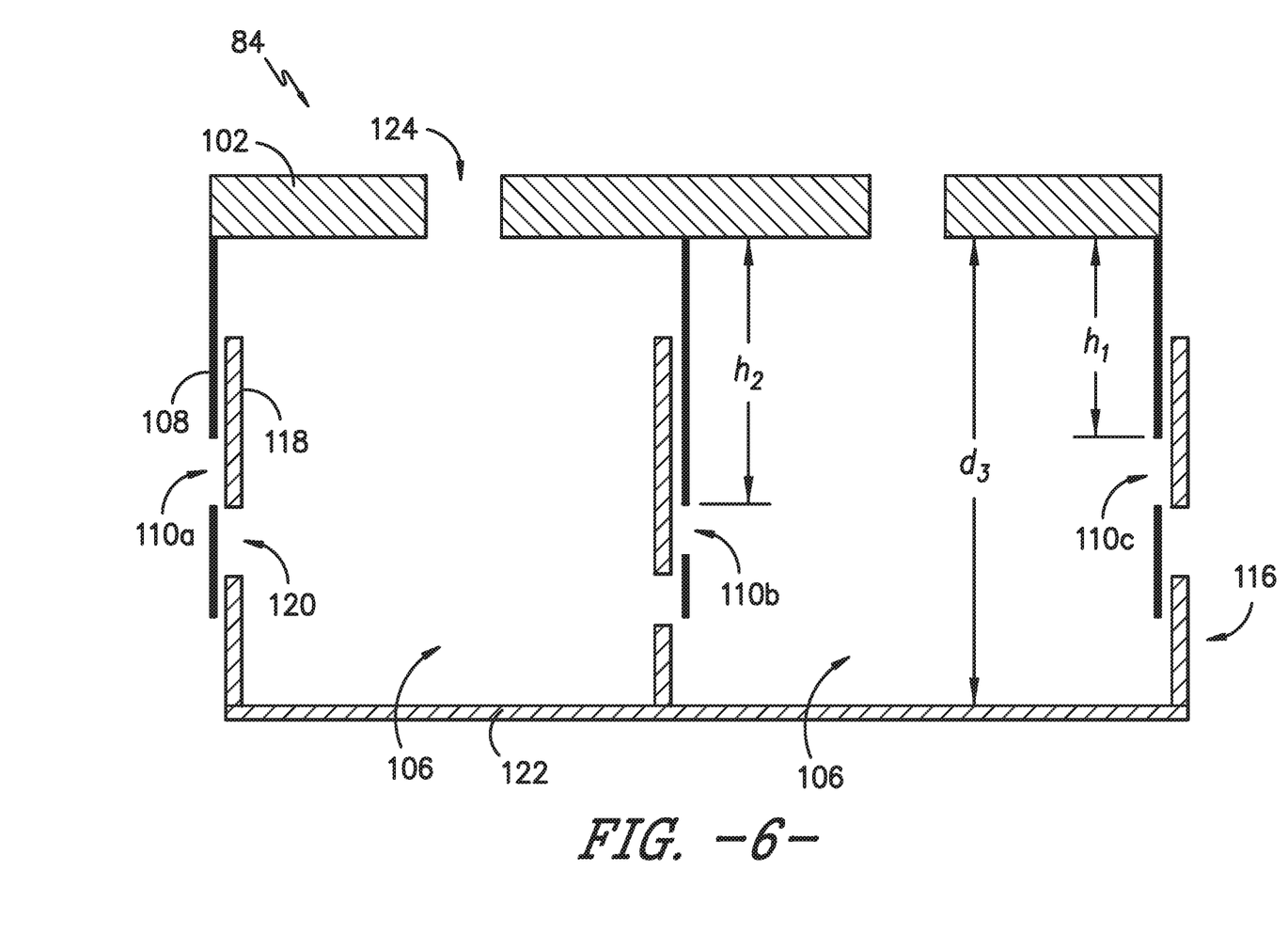

Referring now to FIGS. 4, 5, and 6, a schematic cross-section view is provided of a portion of the acoustic liner 84 of FIG. 1 in different configurations based on operating conditions of the turbofan engine 10. As previously described, the acoustic liner 84 includes core layer 100 that is made up of cavities 106 delineated by lateral walls 108. The lateral walls 108 extend from face sheet 102 toward backing sheet 104, which is formed from a plurality of backing sheet members 116. An exemplary backing sheet member 116 is illustrated in FIGS. 4, 5, and 6, and as depicted in FIG. 4, the backing sheet member 116 extends across the outer end 114 of a portion of the cavities 106 of the core layer 100. The backing sheet member 116 includes a plurality of backing sheet walls 118 extending toward the face sheet 102, and at least one aperture 120 is defined in each wall 118. As shown, the apertures 120 in backing sheet walls 118 align with the apertures 110 defined in lateral walls 108 when the backing sheet member 116 is positioned at a certain distance from the face sheet 102. It will be appreciated that a backing sheet wall 118 extends adjacent each lateral wall 108 defining cavities 106. Accordingly, where a lateral wall 108 does not define an aperture 110, the respective adjacent backing sheet wall 118 may not define an aperture 120 therein.

As illustrated in FIGS. 4, 5, and 6, each backing sheet member 116 moves along the radial direction R with respect to the face sheet 102 to vary the depth of the cavities 106 adjacent the respective backing sheet member 116, i.e., the portion of the plurality of cavities 106 for which the respective backing sheet member 116 extends across the second end 114. Further, as the backing sheet member 116 moves to vary the depth of the cavities 106, the apertures 120 in backing sheet walls 118 move relative to the apertures 110 in lateral walls 108 to vary the porosity of the cavities 106. Referring particularly to FIG. 4, an endwall 122 of the depicted backing sheet member 116 is positioned at a first distance $d_1$ from the face sheet 102 such that each cavity 106 backed by the backing sheet member 116 has a first depth. As such, the cavities 106 backed by the backing sheet member 116 each have a first volume. Turning to FIG. 5, the endwall 122 is positioned at a second distance $d_2$ from the face sheet 102 such that each cavity 106 backed by the backing sheet member 116 has a second depth and a second volume. As depicted in FIG. 6, the endwall 122 is positioned at a third distance $d_3$ from the face sheet 102 such that each cavity 106 backed by the backing sheet member 116 has a third depth and a third volume. It will be appreciated that each backing sheet member 116 of backing sheet 104 is individually movable with respect to the face sheet 102, such that the depth and volume of the cavities 106 may vary throughout the core layer 100. That is, each backing sheet member 116 moves with respect to the face sheet 102 independently of the other backing sheet members 116, such that a first portion of the cavities 106 may have a first depth and a first volume, while a second portion of the cavities 106 have a second depth and a second volume. The individually movable backing sheet members 116 allow more controlled tuning of the noise attenuation provided by the acoustic liner 84. In further embodiments, the backing sheet members 116 may be divided into groups, with each group of backing sheet members 116 encompassing a certain number of the cells or cavities 106. As such, a group of members 116 may move together to control the depth and porosity of the number of cavities 106 in the group. Any suitable actuation mechanism may be used to move the backing sheet members 116, such as a mechanical, electromechanical, pneumatic, or other actuator that allows linear movement of the backing sheet members 116. Moreover, when the backing sheet members 116 move, a supporting structure, such as a plurality of telescopic rods or the like, holds the face sheet 102 in place. The supporting structure may be part of the actuation system that moves the backing sheet members 116, or the supporting structure may be a part of the acoustic liner 84 separate from the actuation system.

Moreover, as illustrated in FIGS. 4, 5, and 6, the backing sheet walls 118 move relative to the lateral walls 108 of the cavities 106 to vary the porosity or percent open area (POA) of the acoustic liner 84. It will be understood that the POA of a cavity wall 108 is the total area of the apertures 110 defined in the wall 108, or the percent of the wall area in which there is no wall material. More particularly, FIG. 4 illustrates a minimum depth and a maximum POA of the depicted cavities 106, where the apertures 120 of the backing sheet member 116 are aligned with the apertures 110 of the cavity walls 108. When the backing sheet member 116 is at the second distance $d_2$ from the face sheet 102, as shown in FIG. 5, the depth of the illustrated cavities 106 is increased while the POA of the cavities 106 is diminished compared to their POA with the backing sheet member 116 at the first distance $d_1$. FIG. 6 illustrates, for the exemplary embodiment shown in FIGS. 4-6, a maximum depth and a minimum POA of the depicted cavities 106, where the apertures 110 of the cavity walls 108 are blocked or closed by the backing sheet walls 118 to prevent acoustic communication between the cavities 106. Thus, the cavities 106, and more particularly, the cavity walls 108, have a maximum porosity or POA when the maximum number of backing sheet member apertures 120 are aligned with cavity wall apertures 110 and a minimum porosity or POA when the fewest number of apertures 120 are aligned with apertures 110, to include when the walls 118 completely block the apertures 110 such that no apertures 120 are aligned with apertures 110. An optimal porosity or POA may be chosen for each engine operating condition, such that the porosity or POA of the cavities 106 may be varied during engine operation to attenuate noise throughout operation.

As shown in FIGS. 4, 5, and 6, the plurality of lateral cavity walls 108 each have a height h, measured from the inner end 112 to the outer end 114 of the core layer 100. In the illustrated embodiment, at least one aperture 110 is defined in each cavity wall 108, and at least two apertures 110 in the cavity walls 108 of the core layer 100 are defined at different heights. More specifically, a first aperture 110a, a second aperture 110b, and a third aperture 110c are illustrated in FIGS. 4-6, with the first and third apertures 110a, 110c being defined at the same first height $h_1$ and the second aperture 110b being defined at a second height $h_2$. In other embodiments, the first and second apertures 110a, 110b may be defined at the same height while the third aperture 110c is defined at a different height, or the second and third apertures 110b, 110c may be defined at the same height while the first aperture 110a is defined at a different height. In still other embodiments, all of the apertures 110 defined in the lateral walls 108 may be defined at the same height, or in yet other embodiments, all of the apertures 110 may be defined at different heights. The apertures 120 in the backing sheet walls 118 may be defined along the height of the respective wall 118 to correspond to the respective aperture 110 in the adjacent wall 108 such that the porosity of the cavities 106 may be controlled by the movement of the backing sheet members 116 relative to the face sheet 102. That is, the percent open area of each cavity wall 108 is variable with the distance the respective backing sheet member 116 is spaced from the face sheet 102.

Additionally or alternatively, the plurality of apertures 110 defined in the lateral walls 108 of the core layer 100 may be of the same or different sizes. That is, each aperture 110 may have the same cross-sectional area, or the cross-sectional areas of two or more apertures 110 may be different. For example, the cross-sectional areas of first, second, and third apertures 110a, 110b, 110c illustrated in FIGS. 4, 5, and 6 all may be the same or all may be different, or the cross-sectional areas of two of the apertures 110 may be the same while the cross-sectional area of the remaining aperture 110 is different. The cross-sectional area of each aperture 120 in backing sheet walls 118 may be the same as or different from the cross-sectional area of the aperture 110 with which the aperture 120 aligns, such that the apertures 120 may have the same or different cross-sectional areas.

By varying the height at which the apertures 110 are located, as well as the size of the apertures 110 and the depth of the cavities 106, different acoustic wavelengths and/or frequencies may be dissipated with variable dissipation efficiency within the core layer 100. More particularly, some sound waves may move more easily from one cavity 106 to an adjacent cavity 106 through the first aperture 110a at the first height $h_1$ and having a first diameter, with the backing sheet member 116 positioned at the first distance $d_1$, than other sound waves, which move more easily from one cavity 106 to an adjacent cavity 106 through an aperture 110 at a different height, having a different cross-sectional area, and/or with the cavities 106 at a different depth.

The positions of the backing sheet member 116 illustrated in FIGS. 4, 5, and 6 may correspond to operating conditions of the turbofan engine 10. As one example, FIG. 5 (partially open apertures 110) may depict a cutback condition, FIG. 6 (completely closed apertures 110) may illustrate an approach condition, and FIG. 4 (completely open apertures 110) may depict a takeoff condition. In other embodiments, FIGS. 4, 5, and 6 may illustrate different or other operating conditions of turbofan engine 10, e.g., FIG. 4 may illustrate a cutback condition rather than a takeoff condition. Further, the exemplary embodiment of FIGS. 4, 5, and 6 is provided by way of example only. The core layer 100 and backing sheet 104 may have different configurations, and each backing sheet member 116 may have additional and/or alternative positions relative to face sheet 102, than as illustrated such that the cavities 106 have different depths and volumes, and the cavity walls 108 have different percent open areas, to attenuate noise for any given operating condition of the turbofan engine 10. For instance, the lateral walls 108 of cavities 106 may have a different number and/or size of apertures 110, and the apertures 110 may have other positions relative to the face sheet 102 than as depicted in the exemplary embodiment, with the number, size, and position of apertures 120 in backing sheet walls 118 corresponding to that of apertures 110 in walls 108.

As further depicted in FIGS. 4, 5, and 6, the face sheet 102 has a plurality of openings 124 defined therein, i.e., the face sheet 102 is porous as previously described and may be formed from wire mesh, a perforated sheet, a woven or nonwoven fibrous material, or the like. The openings 124 permit the egress of sound waves into the core layer 100, such that the acoustic energy of the sound waves may be dissipated as described herein, e.g., by traveling through multiple cavities 106 via openings 110 between cavities, by being received within a cavity 106 having a depth selected to dissipate the particular wavelength and/or frequency of the sound waves at a given engine operating condition, etc.

Figure 7:
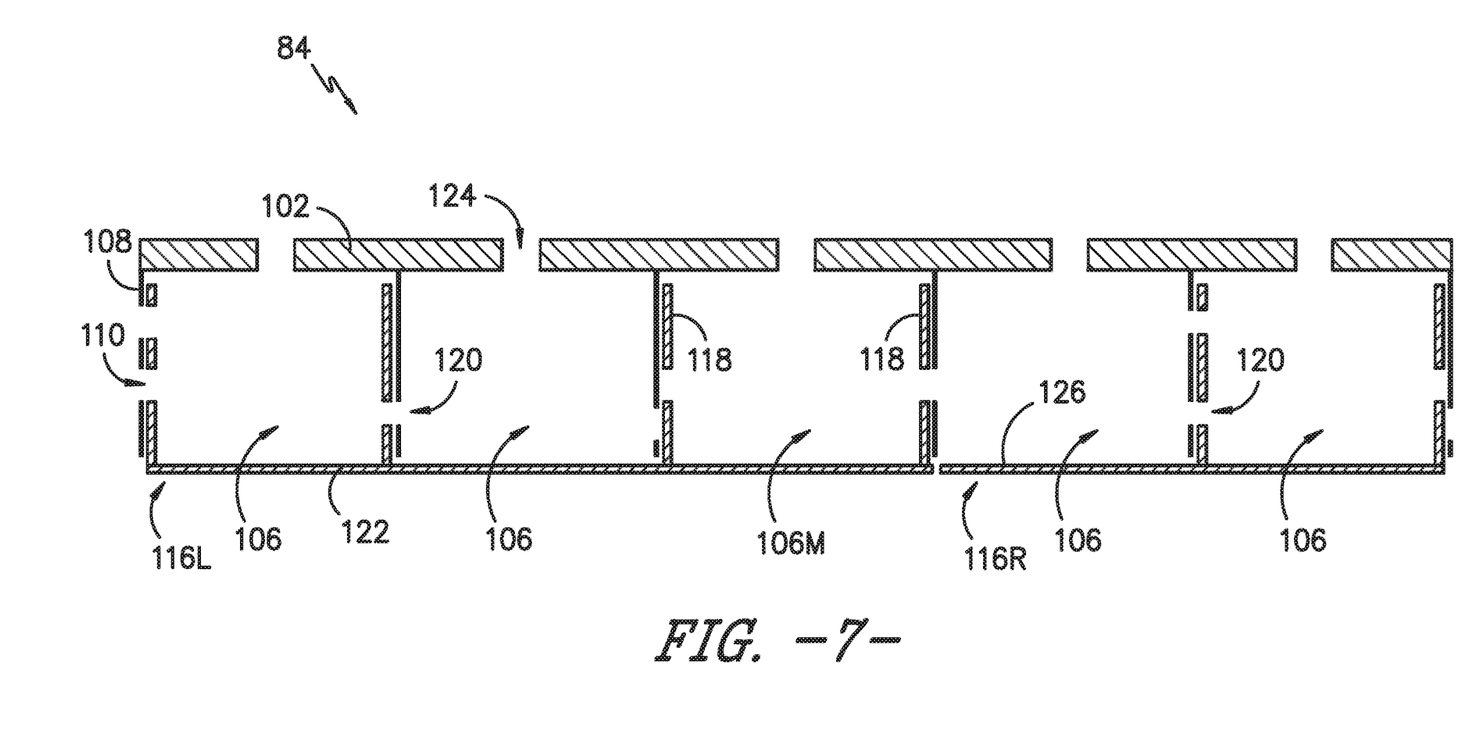
FIG. 7 provides a schematic cross-section view of a portion of the acoustic liner of FIG. 1, illustrating two adjacent backing sheet members of a backing sheet of the acoustic liner, according to an exemplary embodiment of the present subject matter.

FIG. 7 provides a schematic cross-section view of a portion of the acoustic liner 84 of FIG. 1, illustrating two adjacent backing sheet members 116. As previously described and as illustrated in FIG. 7, more than one opening 110 may be defined in a portion or all of the lateral cavity walls 108, with a corresponding number of openings 120 defined in the backing sheet wall 118 adjacent the cavity wall 108. As further illustrated in FIG. 7, the backing sheet 104 is formed from a plurality of backing sheet members 116, and each backing sheet member 116 extends across the second end 114 of more than one cavity 106 and moves independently with respect to the face sheet 102. Preferably, to facilitate assembly of the backing sheet 104 having these characteristics, the backing sheet members 116 are interleaved to form backing sheet 104. Further, each backing sheet member 116 may move in a telescoping manner with respect to the cavities 106 for which the backing sheet member 116 extends across the outer end 114, e.g., such that each backing sheet member 116 telescopes into the cavities 106 for which the backing sheet member 116 extends across the outer end 114 to define a minimum cavity depth of the cavities 106. More particularly, as shown in FIGS. 4 through 7, the backing sheet walls 118 of each backing sheet member 116 extend within cavities 106 adjacent cavity walls 108 such that the backing sheet members 116 telescope into and out of the cavities 106.

Moreover, as depicted in the exemplary embodiment of FIG. 7, at least a portion of the backing sheet members 116 include an endwall projection 126 extending from the backing sheet endwall 122. The endwall projection 126 extends across the second end 114 of the cavity or cavities 106 between adjacent backing sheet members 116, e.g., such that some lateral walls 108 of cavities 106 do not have two adjacent backing sheet member walls 118. Further, with respect to the illustrated embodiment, the endwall projection 126 allows the left backing sheet member 116L to move relative to the face sheet 102 without requiring the right backing sheet member 116R to move or to move at the same rate while providing an endwall to the cavity 106M between the two members 116.

Although described herein with respect to turbofan engine 10 and acoustic liner 84, it will be appreciated that the present subject matter also applies to noise attenuation structures for devices other than turbofan or other gas turbine engines. Such noise attenuation structures have the same general construction as acoustic liner 84. More particularly, a noise attenuation structure includes a face sheet 102 having a plurality of openings 124 defined therein and a backing sheet 104 spaced apart from the face sheet 102. The backing sheet 104 comprises a plurality of backing sheet members 116 that are each spaced a variable distance d from the face sheet 102. Each backing sheet member 116 includes at least one backing sheet wall 118 that defines at least one aperture 120 therein. Further, the noise attenuation structure includes a plurality of cavity walls 108 extending from the face sheet 102 toward the backing sheet 104 such that a plurality of cavities 106 are defined between the face sheet 102 and the backing sheet 104. Each cavity 106 has a volume, and each cavity wall 108 defines at least one aperture 110 therein. Moreover, the face sheet 102 defines a first end 112 of each cavity 106 and a backing sheet member 116 defines a second end 114 of each cavity 106 such that the volume of each cavity 106 is variable with the distance d the backing sheet member 116 is spaced from the face sheet 102. A single backing sheet member 116 defines the second end 114 of more than one cavity 106, and the at least one backing sheet wall 118 of each backing sheet member 116 extends adjacent and parallel to a cavity wall 108 such that a percent open area of the aperture 110 in the cavity wall 108 is variable with the distance d the backing sheet member 116 is spaced from the face sheet 102. The backing sheet members 116 of the backing sheet 104 of the noise attenuation structure may be actuated to move with respect to the face sheet 102 in response to one or more operating conditions of the device in which the noise attenuation structure is installed.

Accordingly, the present subject matter describes various noise attenuation structures, including acoustic liners for gas turbine engines, that have cavities that are open to one another, with a POA that can be changed in response to operating conditions. The POA may be varied using a plurality of members that move independently with respect to one another and that also vary the depth, and therefore the volume, of the cavities. In exemplary embodiments, a single member changes the POA and depth of multiple cavities at the same time, but the single member does not control the POA and depth of all of the cavities, such that the cavities may have a different POA and depth throughout the layer of cavities. With particular reference to acoustic liners, configurations as described herein allow the acoustic liner to be slimmer (i.e., thinner along the radial direction) than typical acoustic liners while still providing attenuation of lower frequencies by controlling dissipation laterally (i.e., both axially and circumferentially) rather than radially. More particularly, by forming openings in the lateral walls that separate laterally adjacent cavities, the individual cavities are transformed into a single long cavity, which allows attenuation of longer wavelengths than can be attenuated in the relatively short individual cavities. Further, by varying the depth and POA of the cavities based on operating conditions, noise attenuation may be tuned based on sound wave phase changes between operating conditions. For example, at the approach condition for a turbofan engine, the phase difference is small, and the POA of the cavities may be small or minimized. At the cutback and takeoff conditions, the phase difference increases, as well as the pressure gradient in the cavities. Accordingly, the POA may be increased to take advantage of the pressure gradient and allow acoustic waves to move between cavities to help dissipate the acoustic energy. These and other advantages may be realized from the subject matter described herein.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An acoustic liner for a gas turbine engine, comprising:
a face sheet;
a backing sheet spaced apart from the face sheet; and
a plurality of cavities defined between the face sheet and the backing sheet, the plurality of cavities defined by cavity walls,
wherein a plurality of backing sheet walls extend from the backing sheet toward the face sheet, the backing sheet walls extending adjacent the cavity walls, the backing sheet being movable with respect to the face sheet such that the cavities have a variable depth,
wherein at least one cavity wall aperture is defined in at least one of the cavity walls to allow acoustic communication between two or more of the cavities, and
wherein each of the backing sheet walls has at least one aperture defined therein to vary a porosity of the cavities as the backing sheet moves with respect to the face sheet.

2. The acoustic liner of claim 1, wherein the backing sheet comprises a plurality of backing sheet members, each of the backing sheet members individually movable with respect to the face sheet.

3. The acoustic liner of claim 2, wherein the plurality of cavities forms a core layer, wherein an inner end of the core layer is attached to the face sheet and an outer end of the core layer extends toward the backing sheet, and wherein each of the backing sheet members extends across the outer end of a portion of the cavities of the core layer.

4. The acoustic liner of claim 3, wherein at least one of the plurality of backing sheet walls extends from each of the backing sheet members toward the face sheet such that movement of one or more of the backing sheet members with respect to the face sheet varies the depth and porosity of the portion of the plurality of cavities for which the one or more backing sheet members extend across the outer end.

5. The acoustic liner of claim 1, wherein the face sheet has a plurality of openings defined therein.

6. The acoustic liner of claim 1, wherein the cavity walls have a height, wherein at least one aperture is defined in each of the cavity walls, and wherein at least two apertures defined in the cavity walls are defined at different heights.

7. The acoustic liner of claim 1, wherein the depth and porosity of the cavities are variable based on an operating condition of the gas turbine engine.

8. The acoustic liner of claim 1, wherein the gas turbine engine includes a fan section, wherein the fan section includes a fan having a plurality of fan blades, and wherein the acoustic liner is disposed along an inner wall of the fan section.

9. An acoustic liner for a gas turbine engine, comprising:
a face sheet;
a backing sheet spaced apart from the face sheet, the backing sheet comprising a plurality of backing sheet members that are each spaced a variable distance from the face sheet, each of the backing sheet members including at least one backing sheet wall, each of the backing sheet walls defining at least one aperture therein; and
a plurality of cavity walls extending from the face sheet toward the backing sheet such that a plurality of cavities are defined between the face sheet and the backing sheet, each of the cavities having a volume, each of the cavity walls defining at least one aperture therein, the cavities forming a core layer,
wherein the face sheet is positioned at a first end of the core layer and at least one of the backing sheet members provides an endwall at a second end of the core layer such that the volume of each of the cavities is variable with the distance the at least one of the backing sheet members is spaced from the face sheet,
wherein the at least one of the backing sheet members extends across the second end of more than one of the cavities,
wherein the at least one backing sheet wall of each of the backing sheet members extends adjacent and parallel to a cavity wall such that a percent open area of the cavity wall is variable with the variable distance that the corresponding backing sheet member is spaced from the face sheet, and
wherein the variable distance that each of the backing sheet members is spaced from the face sheet is variable based on an operating condition of the gas turbine engine.

10. The acoustic liner of claim 9, wherein each of the backing sheet members is individually movable with respect to the face sheet.

11. The acoustic liner of claim 9, wherein the plurality of cavity walls has a height, and wherein at least two apertures defined in the plurality of cavity walls are defined at different heights.

12. The acoustic liner of claim 9, wherein each of the backing sheet members telescopes into the cavities for which the backing sheet member extends across the second end to define a minimum cavity depth of each of the cavities.

13. The acoustic liner of claim 9, wherein the percent open area is at a maximum when a maximum number of the apertures of the backing sheet walls are aligned with the apertures of the cavity walls.

14. The acoustic liner of claim 9, wherein the backing sheet members are movable to a distance from the face sheet such that the backing sheet walls block the apertures of the cavity walls.

15. The acoustic liner of claim 9, wherein the face sheet has a plurality of openings defined therein.

16. The acoustic liner of claim 9, wherein the gas turbine engine includes a fan section, wherein the fan section includes a fan having a plurality of fan blades and a nacelle circumferentially surrounding the fan, and wherein the acoustic liner is disposed along an inner wall of the fan section.

17. A noise attenuation structure, comprising:
a face sheet having a plurality of openings defined therein;
a backing sheet spaced apart from the face sheet, the backing sheet comprising a plurality of backing sheet members that are each spaced a variable distance from the face sheet, each of the backing sheet members including at least one backing sheet wall, each of the backing sheet walls defining at least one aperture therein; and
a plurality of cavity walls extending from the face sheet toward the backing sheet such that a plurality of cavities are defined between the face sheet and the backing sheet, each of the cavities having a volume, each of the cavity walls defining at least one aperture therein,
wherein the face sheet defines a first end of each of the cavities and at least one of the backing sheet members defines a second end of each of the cavities such that the volume of each of the cavities is variable with the distance the at least one of the backing sheet members is spaced from the face sheet,
wherein at least one of the backing sheet members defines the second end of more than one of the cavities, and
wherein the at least one backing sheet wall of each of the backing sheet members extends adjacent and parallel to at least one of the cavity walls such that a percent open area of the aperture in the at least one of the cavity walls is variable with the distance that the backing sheet member is spaced from the face sheet.

18. The noise attenuation structure of claim 17, wherein the backing sheet members are interleaved to form the backing sheet.

19. The noise attenuation structure of claim 17, wherein each of the backing sheet members is individually movable with respect to the face sheet.

* * * * *